US009291482B2

(12) United States Patent
Kodama et al.

(10) Patent No.: US 9,291,482 B2
(45) Date of Patent: Mar. 22, 2016

(54) LINEAR ENCODER

(71) Applicant: MITUTOYO CORPORATION, Kawasaki-shi, Kanagawa (JP)

(72) Inventors: Kazuhiko Kodama, Utsunomiya (JP); Kazushi Kikuchi, Utsunomiya (JP); Takanori Otsuka, Utsunomiya (JP)

(73) Assignee: MITUTOYO CORPORATION, Kawasaki (JP)

( * ) Notice: Subject to any disclaimer, the term of this patent is extended or adjusted under 35 U.S.C. 154(b) by 184 days.

(21) Appl. No.: 14/276,487

(22) Filed: May 13, 2014

(65) Prior Publication Data
US 2014/0338446 A1  Nov. 20, 2014

(30) Foreign Application Priority Data
May 15, 2013  (JP) .................................. 2013-103465

(51) Int. Cl.
*G01D 11/26* (2006.01)
*G01D 11/24* (2006.01)
*G01D 5/347* (2006.01)

(52) U.S. Cl.
CPC ............ *G01D 11/26* (2013.01); *G01D 5/34769* (2013.01)

(58) Field of Classification Search
CPC ...... G01D 11/24; G01D 11/26; G01D 11/245
USPC ............................................................ 73/431
See application file for complete search history.

(56) References Cited

U.S. PATENT DOCUMENTS 5,730,444 A * 3/1998 Notter ............... B29C 45/14065
277/554

* cited by examiner

*Primary Examiner* — Lisa Caputo
*Assistant Examiner* — Jamel Williams
(74) *Attorney, Agent, or Firm* — Rankin, Hill & Clark LLP

(57) ABSTRACT

A linear encoder includes a scale; a frame in which the scale is held, the frame having an opening that extends in a longitudinal direction of the frame; and a pair of elongated dustproof members arranged to face each other in the opening. At least a part of each dustproof member is elastically deformable. Each dustproof member includes a first end portion in a transverse direction of the dustproof member, a first projecting portion disposed on the first end portion, and a second end portion in the transverse direction. The opening has a pair of fitting recesses formed therein. The first end portion of each dustproof member is fitted in a corresponding one of the fitting recesses, and the first projecting portion contacts the corresponding one of the fitting recesses.

18 Claims, 6 Drawing Sheets

LINEAR ENCODER

CROSS REFERENCES TO RELATED APPLICATIONS

The present invention contains subject matter related to Japanese Patent Application No. 2013-103465 filed in the Japan Patent Office on May 15, 2013, the entire contents of which are incorporated herein by reference.

BACKGROUND OF THE INVENTION

1. Field of the Invention

The present invention relates to a linear encoder.

2. Description of the Related Art

A linear encoder mounted in a machine tool or the like is an example of a measurement device. First, a general structure of a linear encoder will be described. FIG. 1 is a schematic diagram illustrating a general linear encoder. FIG. 6 is a sectional view of the general linear encoder. In the following description, the longitudinal direction, the transverse direction, and the thickness direction of a scale included in the linear encoder are referred to as the X-axis direction, the Y-axis direction, and the Z-axis direction, respectively, for convenience (see FIG. 6).

As illustrated in FIGS. 1 and 6, in a general linear encoder, a scale 2 is held in a frame 1, and an opening 1a is formed in the frame 1 so as to extend in the X-axis direction. The scale 2 and a detector 3 are moved relative to each other while the detector 3 is inserted through the opening 1a, and the detector 3 obtains position information from the scale 2 (see, for example, Japanese Unexamined Patent Application Publication No. 2008-267989).

In this structure, to prevent oil, dust including machining dust, etc., from entering the frame 1 through the opening 1a, the frame 1 is provided with a first dustproof member 101 and a second dustproof member 102 arranged to face each other across the opening 1a in the Z-axis direction. The first dustproof member 101 and the second dustproof member 102 are disposed with the detector 3 interposed therebetween. When the scale 2 and the detector 3 are moved relative to each other, the detector 3 moves along the opening 1a of the frame 1 in the X-axis direction while thrusting the first dustproof member 101 and the second dustproof member 102 aside.

The structure of each of the first dustproof member 101 and the second dustproof member 102 will now be described. FIG. 7 illustrates a structure of the first dustproof member 101 before it is deformed. FIG. 8 illustrates the manner in which the first dustproof member 101 and the second dustproof member 102 cover the opening 1a of the frame 1 in a region where the detector 3 is not inserted through the opening 1a. FIG. 9 illustrates the manner in which the first dustproof member 101 and the second dustproof member 102 cover the opening 1a of the frame 1 in a region where the detector 3 is inserted through the opening 1a.

The first dustproof member is made of a flexible material. The length of the first dustproof member 101 in the X-axis direction is substantially equal to the length of the opening 1a of the frame 1 in the X-axis direction. As illustrated in FIG. 7, the first dustproof member 101 includes a base portion 101a, a tongue portion 101b, and a projecting portion 101c.

The base portion 101a is fitted in a first fitting recess 1b1. In order that the base portion 101a can be easily inserted into the first fitting recess 1b1 of the frame 1, the base portion 101a has a size that is smaller than that of the first fitting recess 1b1 of the frame 1 when viewed in the X-axis direction. Therefore, the base portion 101a and the first fitting recess 1b1 of the frame 1 are not in close contact with each other, and a gap is easily formed between the base portion 101a and the first fitting recess 1b1 of the frame 1.

The tongue portion 101b has a plate-like shape and projects from the base portion 101a. When the base portion 101a is fitted in the first fitting recess 1b1 of the frame the tongue portion 101b projects from the opening of the first fitting recess 1b1.

The projecting portion 101c is formed on a surface of the tongue portion 101b facing in the positive Y-axis direction. The projecting portion 101c has a substantially right triangular shape when viewed, in the X-axis direction. A surface of the projecting portion 101c near the tip of the first dustproof member 101 is substantially perpendicular to the tongue portion 101b.

The second dustproof member 102 will not be described in detail because its structure is similar to that of the first dustproof member 101. The second dustproof member 102 includes a base portion 102a fitted in a second fitting recess 1b2 of the frame 1, a tongue portion 102b projecting from the base portion 102a, and a projecting portion 102c formed on a side of the tongue portion 102b facing in the positive Y-axis direction. When the base portion 102a is fitted in the second fitting recess 1b2 of the frame 1, the tongue portion 102b projects through the opening of the second fitting recess 1b2.

The first fitting recess 1b1 and the second fitting recess 1b2 are formed in the frame 1 so as to face each other in the Z-axis direction with the opening 1a of the frame 1 therebetween. The length of the first fitting recess 1b1 and the length of the second fitting recess 1b2 in the X-axis direction are each substantially equal to the length of the opening 1a in the X-axis direction.

In the region where the detector 3 is not inserted through the opening 1a of the frame 1, as illustrated in FIG. 8, the tongue portion 101b of the first dustproof member 101 and the tongue portion 102b of the second dustproof member 102 contact each other to close the opening 1a of the frame 1 in such a state that the first dustproof member 101 and the second dustproof member 102 are warped.

At this time, for example, the tongue portion 102b of the second dustproof member 102 is engaged with the projecting portion 101c of the first dustproof member 101, and the tongue portion 101b of the first dustproof member 101 is engaged with the tip of the tongue portion 102b of the second dustproof member 102. Thus, even when the first dustproof member 101 or the second dustproof member 102 tries to rotate in the negative Y-axis direction, the first dustproof member 101 or the second dustproof member 102 is restrained by the restoring force thereof.

In the region where the detector 3 is inserted through the opening 1a of the frame 1, as illustrated in FIG. 9, the tongue portion 101b of the first dustproof member 101 and the tongue portion 102b of the second dustproof member 102 sandwich the detector 3 in such a state that the first dustproof member 101 and the second dustproof member 102 are warped. At this time, the projecting portion 101c of the tongue portion 101b of the first dustproof member 101 and the projecting portion 102c of the tongue portion 102b the second dustproof member 102 contact the detector 3.

In the dustproof structure of a general linear encoder, as described above, gaps are likely to be formed between the base portion 101a of the first dustproof member 101 and the first fitting recess 1b1 of the frame 1 and between the base portion 102a of the second dustproof member 102 and the second rioting recess 1b2 of the frame 1. Therefore, dust and the like are likely to enter the frame 1 from the outside.

SUMMARY OF THE INVENTION

The present invention has been made to solve the above-described problems, and an object of the present invention is to provide a linear encoder that can prevent dust and the like from entering the frame.

A linear encoder according to a first aspect of the present invention includes a scale; a frame in which the scale is held, the frame having an opening that extends in a longitudinal direction of the frame; and a pair of elongated dustproof members arranged to face each other in the opening. At least a part of each dustproof member is elastically deformable. Each dustproof member includes a first end portion in a transverse direction of the dustproof member, a first projecting portion disposed on the first end portion, and a second end portion in the transverse direction. The opening has a pair of fitting recesses formed therein. The first end portion of each dustproof member is fitted in a corresponding one of the fitting recesses, and the first projecting portion contacts the corresponding one of the fitting recesses.

A linear encoder according to a second aspect of the present invention includes a scale; a frame in which the scale is held, the frame having an opening that extends in a longitudinal direction of the frame; and a pair of elongated dustproof members arranged to face each other in the opening. At least a part of each dustproof member is elastically deformable. Each dustproof member includes a first end portion in a transverse direction of the dustproof member, and a second end portion in the transverse direction. The opening has a pair of fitting recesses formed therein, and each fitting recess has a second projecting portion formed therein. The first end portion of each dustproof member is fitted in a corresponding one of the fitting recesses, and the first end portion contacts the second projecting portion.

In the above-described linear encoder, the first projecting portion preferably has an arc-like cross-sectional shape.

In the above-described linear encoder, the second projecting portion preferably has an arc-like cross-sectional shape.

In the above-described linear encoder, a pair of the first projecting portions are preferably disposed on both surfaces of the first end portion of each dustproof member.

In the above-described linear encoder, a pair of the second projecting portions are preferably disposed on surfaces of each fitting recess that face both surfaces of the first end portion of each dustproof member.

In the above-described linear encoder, preferably, each dustproof member further includes a third projecting portion disposed on the second end portion, the third projecting portion having an arc-like cross-sectional shape.

In the above-described linear encoder, an end of the second end portion of each dustproof member preferably has an arc-like cross-sectional shape.

The present invention provides a linear encoder that can prevent dust and the like from entering the frame.

DESCRIPTION OF THE PREFERRED EMBODIMENTS

Embodiments of the present invention will now be described with reference to the drawings. However, the present invention is not limited to the embodiments. To facilitate understanding, the following description and drawings are simplified as appropriate.

First Embodiment

First, the basic structure of a linear encoder of the present embodiment will be described. The dustproof structure of the present embodiment may be applied to a measurement device other than the linear encoder.

Figure 1:
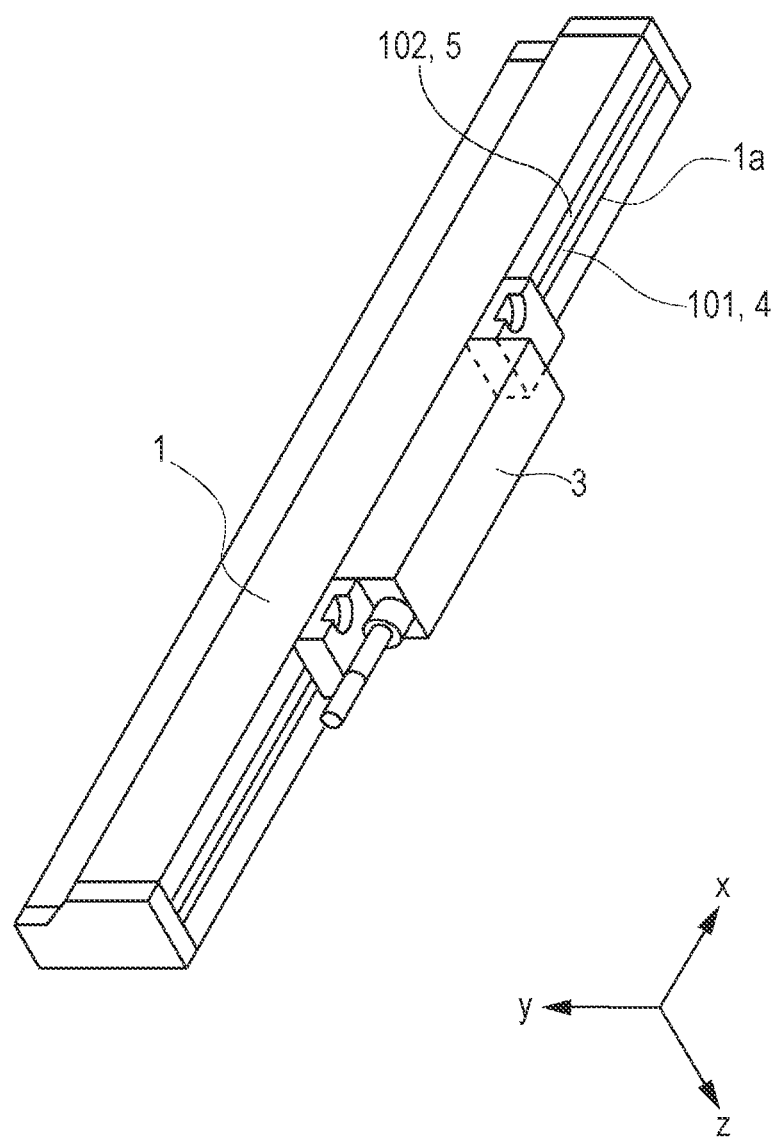
FIG. 1 is a schematic perspective view of a general linear encoder.
Figure 6:
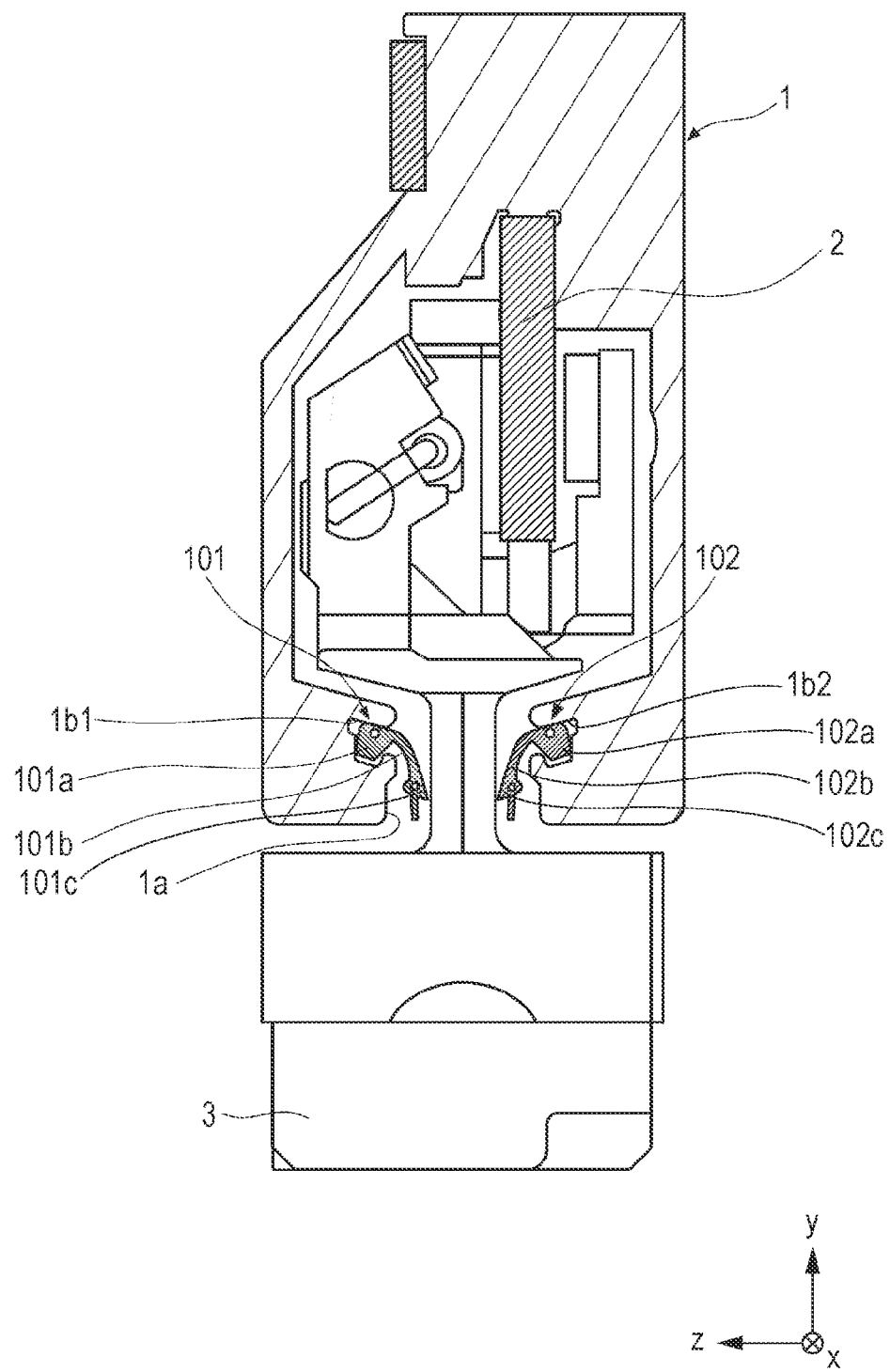
FIG. 6 is a schematic sectional view of a general linear encoder.
Figure 7:
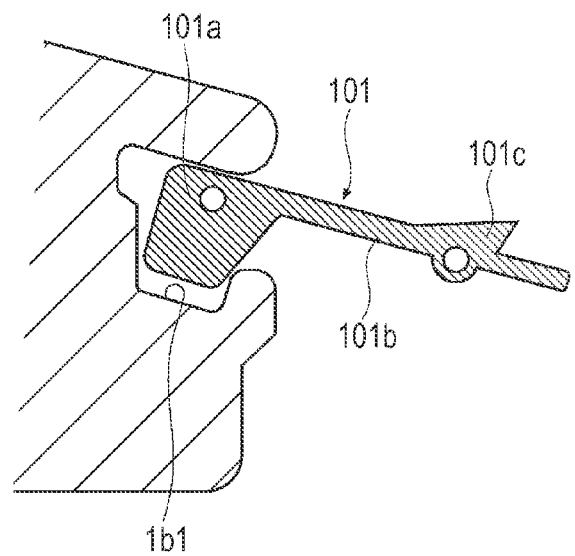
FIG. 7 is a schematic sectional view of a first dustproof member of a dustproof structure of the general linear encoder.
Figure 8:
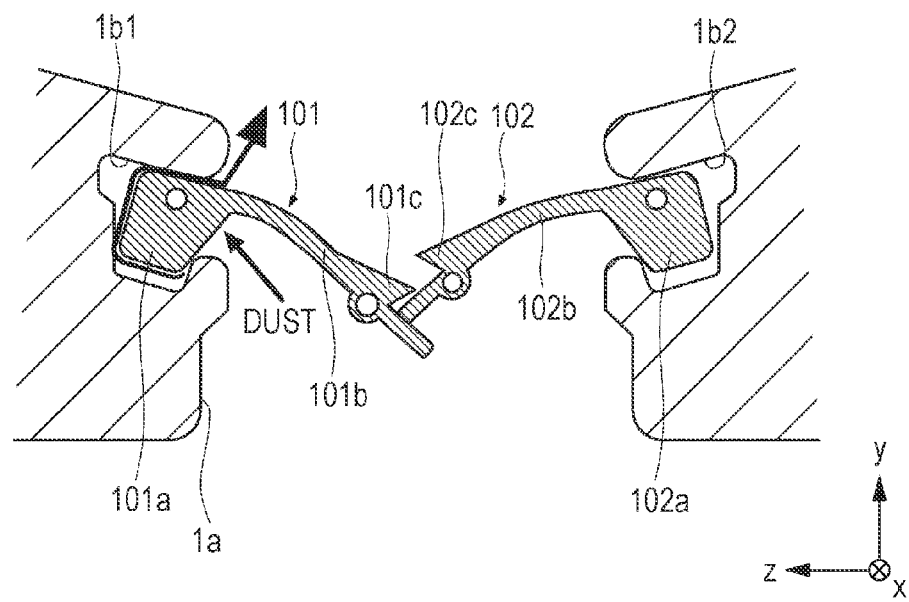
FIG. 8 is a schematic sectional view illustrating the manner in which the first dustproof member and a second dustproof member of the dustproof structure of the general linear encoder cover an opening of a frame in a region where a detector is not inserted through the opening.
Figure 9:
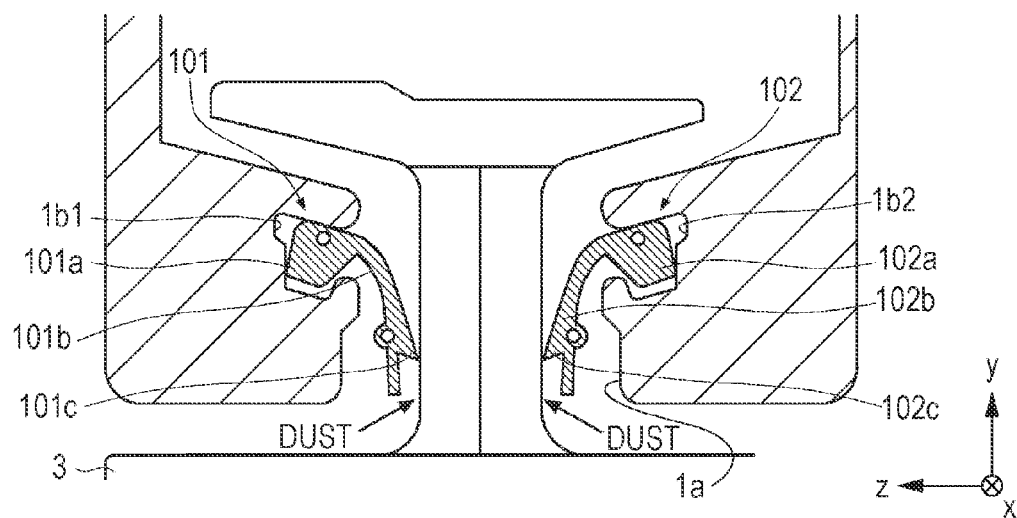
FIG. 9 is a schematic sectional view illustrating the manner in which the first dustproof member and the second dustproof member of the dustproof structure of the general linear encoder cover the opening of the frame in a region were the detector is inserted through the opening.

Although a structure of a linear encoder has been described above in the Background of the Invention section, it will be briefly described again with reference to FIGS. 1 and 6. As illustrated in FIGS. 1 and 6, in a general linear encoder, a scale 2 is held in a frame 1 and an opening 1a is formed in the frame 1 so as to extend in the X-axis direction (in the longitudinal direction of the scale 2). The scale 2 and a detector 3 are moved relative to each other in the longitudinal direction while the detector 3 is inserted through the opening 1a, and the detector 3 obtains position information from the scale 2.

In this structure, to prevent, dust and the like from entering the opening 1a of the frame 1, the frame 1 is provided with a pair of dustproof members (a first dustproof member 4 and a second dustproof member 5).

The scale 2 may be, for example, an optical scale or an electromagnetic induction scale for a general linear encoder. The detector 3 is configured to be capable of obtaining the position information from the scale 2.

The structure of the frame 1 will now be described briefly. The frame 1 has a substantially rectangular-parallelepiped shape having a predetermined thickness. The longitudinal direction of the frame 1 is the X-axis direction, and the width direction of the frame 1 is the Y-axis direction.

A space is formed in the frame 1, and the scale 2 and the detector 3 can be held in the space. In a surface of the frame 1 parallel to the X-axis direction (the lower surface in FIG. 6), the opening 1a is formed so as to extend in the longitudinal direction. The space formed in the frame 1 is connected to the outside through the opening 1a. The width of the opening 1a (the dimension in the Z-axis direction) is smaller than the width of the space (the dimension in the Z-axis direction).

Figure 3:
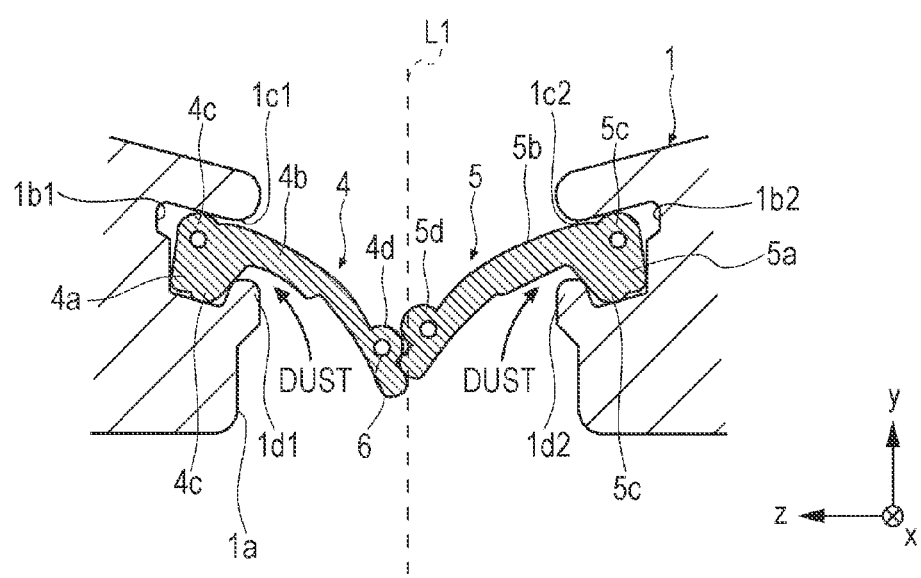
FIG. 3 is a schematic sectional view illustrating the manner in which a first dustproof member and a second dustproof member of the dustproof structure according to the first embodiment cover an opening of a frame in a region where a detector is not inserted through the opening.

As illustrated in FIG. 3, the opening 1a is formed between walls that face each other along the longitudinal direction (along the XY plane). A first fitting recess 1b1 and a second fitting recess 1b2 are respectively formed in the walls so as to extend in the longitudinal direction. Base portions 4a and 5a of the first dustproof member 4 and the second dustproof member 5, which will be described below, are respectively fitted in the first fitting recess 1b1 and the second fitting recess 1b2.

With this structure, the first dustproof member 4 and the second dustproof member 5 are arranged to face each other in the opening 1a of the frame 1.

Figure 2:
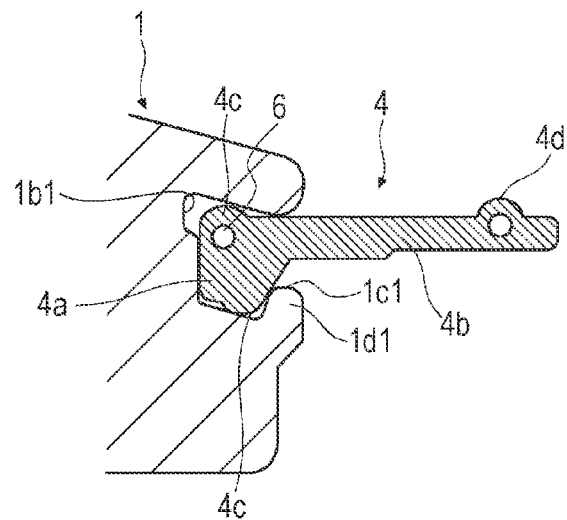
FIG. 2 is a schematic sectional view of a first dustproof member of a dustproof structure according to a first embodiment.
Figure 4:
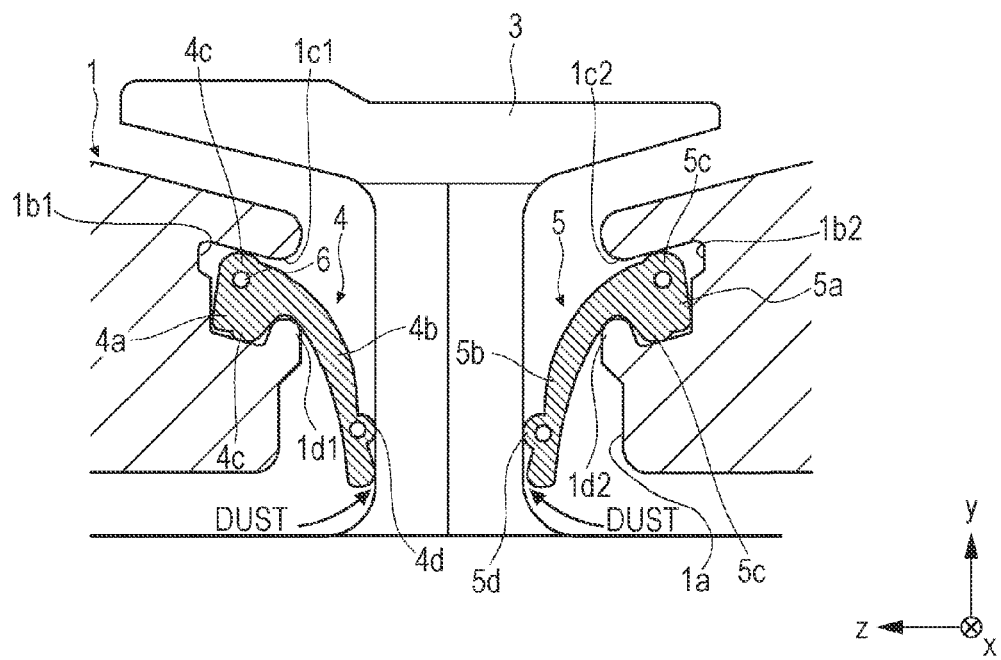
FIG. 4 is a schematic sectional view illustrating the manner in which the first dustproof member and the second dustproof member of the dustproof structure according to the first embodiment cover the opening of the frame in a region where the detector is inserted through the opening.

The first dustproof member 4 and the second dustproof member 5 will now be described. FIG. 2 illustrates the shape of the first dustproof member 4 when viewed in the X-axis direction (the shape of a cross section perpendicular to the X-axis). FIG. 3 illustrates the manner in which the first dustproof member 4 and the second dustproof member 5 cover the opening 1a of the frame 1 in a region where the detector 3 is not inserted through the opening 1a. FIG. 4 illustrates the manner in which the first dustproof member 4 and the second dustproof member 5 cover the opening 1a of the frame 1 in a region where the detector 3 is inserted through the opening 1a.

At least a part of each of the first dustproof member 4 and the second dustproof member 5 is elastically deformable. The first dustproof member 4 and the second dustproof member 5 of the present embodiment are made of a flexible material. For example, the first dustproof member 4 and the second dustproof member 5 are made of urethane, nitrile butadiene rubber (NBR), or fluorocarbon rubber. A wire 5, which is made of a metal or a synthetic fiber and which extends in the longitudinal direction, is disposed in each of the first dustproof member 4 and the second dustproof member 5 so that extension of the dustproof members 4 and 5 due to oil or the like can be suppressed.

As illustrated in FIG. 2, the first dustproof member 4 includes the base portion 4a, a tongue portion 4b, first projecting portions 4c, and a second projecting portion 4d. The first dustproof member 4 has an elongated substantially plate-like shape. The length of the first dustproof member 4 in the X-axis direction, which will be described in detail below, is set so that the opening 1a of the frame 1 can be reliably covered by the first dustproof member 4 and the second dustproof member 5.

The length of the base portion 4a in the X-axis direction is substantially equal to the length of the opening 1a of the frame 1 in the X-axis direction. The base portion 4a is configured to be fitted in the first fitting recess 1b1 of the frame 1. When viewed in the X-axis direction, the base portion 4a of the present embodiment has a substantially rectangular shape and has a size such that the base portion 4a can be fitted in the first fitting recess 1b1 of the frame 1. The shape of the base portion 4a is not particularly limited as long as the first dustproof member 4 can be supported by the first fitting recess 1b1 of the frame 1.

The first fitting recess 1b1 of the frame 1 is arranged so as to face the second fitting recess 1b2 across the opening 1a of the frame 1 in the Z-axis direction. The first fitting recess 1b1 has a substantially rectangular shape when viewed in the X-axis direction, and has a first opening 1c1 that faces the opening 1a. The shape of the first fitting recess 1b1 is not limited as long as the base portion 4a of the first dustproof member 4 can be appropriately fitted in the first fitting recess 1b1.

The first opening 1c1 of the first fitting recess 1b1 is partially covered by a first side wall 1d1, which projects in the positive Y-axis direction from a part of the frame 1 near the opening 1a of the first fitting recess 1b1. Preferably, the tip portion of the first side wall 1d1 has an arc-like cross-sectional shape so as not to damage the first dustproof member 4 when the first dustproof member 4 contacts the tip portion.

With regard to the first dustproof member 4, the tongue portion 4b is formed so as to extend over substantially the entirety of the base portion 4a in the longitudinal, direction, and projects from the base portion 4a. The tongue portion 4b of the present embodiment has a plate-like shape, and a base end of the tongue portion 4b is connected to a corner portion of the base portion 4a adjacent to the opening 1a. When the tongue portion 4b is not deformed and the first dustproof member 4 is fitted in the first fitting recess 1b1 of the frame 1, the tongue portion 4b extends in substantially the Z-axis direction and protrudes into the opening 1a through the first opening 1c1. As will be described below, the distance by which the tongue portion 4b projects into the opening 1a, that is, the width of the tongue portion 4b, is set so that the opening 1a of the frame 1 can be reliably covered by the first dustproof member 4 and the second dustproof member 5, which oppose each other.

The first projecting portions 4c are formed so as to extend over substantially the entirety of the base portion 4a in the longitudinal direction. The first projecting portions 4c contact the first fitting recess 1b1 of the frame 1 when the tip portion of the first dustproof member 4 is pivotally deformed in the negative Y-axis direction. The shapes and the like of the first projecting portions 4c will be described below.

The second projecting portion 4d is formed so as to extend over substantially the entirety of the tongue portion 4b in the longitudinal direction. The second projecting portion 4d projects from a part of a surface of the tongue portion 4b near the tip portion, the surface facing in the positive Y-axis direction. The function of the second projecting portion 4d will be described below.

Detailed description of the second dustproof member 5 will be omitted, because the structure of the second dustproof member 5 is substantially the same as that of the first dustproof member 4. The second dustproof member 5 includes the base portion 5a fitted in the second fitting recess 1b2 of the frame 1, a tongue portion 5b that projects from the base portion 5a, first projecting portions 5c formed on the base portion 5a, and a second projecting portion 5d formed on the tongue portion 5b.

As illustrated in FIG. 3, the first fitting recess 1b1 and the second fitting recess 1b2 of the frame 1 are line-symmetric with respect to a line L1 that passes through the center of the opening 1a of the frame 1 in the Z-axis direction and that extends in the Y-axis direction. A second opening 1c2 facing the opening 1a is partially covered by a second side wall 1d2. The tongue portion 5b of the second dustproof member 5 projects into the opening 1a through the second opening 1c2.

As illustrated in FIG. 3, with the first dustproof member 4 and the second dustproof member 5 having the structures described above, in the region where the detector 3 is not inserted through the opening 1a of the frame 1, the tip portion of the first dustproof member 4 and the tip portion of the second dustproof member 5 contact each other to close the opening 1a of the frame 1 in such a state that the first dustproof member 4 and the second dustproof member 5 are warped. In this state, the base portion 4a of the first dustproof member 4 is engaged with the first side wall 1d1 of the frame 1, the base portion 5a of the second dustproof member 5 is engaged the second side wall 1d2 of the frame 1, and the tip portion of each of the dustproof members 4 and 5 is pivotally deformed in the negative Y-axis direction.

In the present embodiment, the first dustproof member 4 and the second dustproof member 5 are maintained in a warped state, because the tip portion of the second dustproof member 5 is engaged with the second projecting portion 4d of the first dustproof member 4 and the tip portion of the first dustproof member 4 is engaged with the tip portion of the second dustproof member 5.

At this time the first dustproof member 4 exerts a restoring force in a direction such that the second dustproof member 5 is pushed, and the second dustproof member 5 exerts a restoring force in a direction such that the first dustproof member 4 is pushed. Therefore, even when the tip portion of the first dustproof member 4 or the tip portion of the second dustproof member 5 tries to be pivotally deformed in the negative Y-axis direction to change the state of the tip portion of the first dustproof member 4 and the tip portion of the second dustproof member 5 from the closed state to an open state, the first dustproof member 4 or the second dustproof member 5 is restrained by the restoring force thereof. Therefore, dust and the like can be prevented from entering the frame 1

As illustrated in FIG. 4, in the region where the detector 3 is inserted through the opening 1a of the frame 1, the tongue portion 4b of the first dustproof member 4 and the tongue portion 5b of the second dustproof member 5 sandwich the detector 3 to close the opening 1a of the frame 1 in such a state that the first dustproof member 4 and the second dustproof member 5 are warped.

In the present embodiment, the first dustproof member 4 and the second dustproof member 5 are maintained in a warped state, because the second projecting portion 4d of the first dustproof member 4 contacts a surface of the detector 3 facing in the positive Z-axis direction and the second projecting portion 5d of the second dustproof member 5 contacts a surface of the detector 3 facing in the negative Z-axis direction.

At this time, the first dustproof member 4 exerts a restoring force in a direction such that the detector 3 is pushed, and the second dustproof member 5 also exerts a restoring force in a direction such that the detector 3 is pushed. Therefore, even when the tip portion of the first dustproof member 4 or the tip portion of the second dustproof member 5 tries to be pivotally deformed in the negative Y-axis direction to change the state of the second projecting portion 4d of the first dustproof member 4 and the detector 3 or the state of the second projecting portion 5d of the second dustproof member 5 and the detector 3 from the closed state to an open state, the first dustproof member 4 or the second dustproof member 5 is restrained by the restoring force thereof. Therefore, dust and the like can be prevented from entering the frame 1.

When the first dustproof member 4 and the second dustproof member 5 are maintained in the warped state as described above, the first projecting portions 4c of the first dustproof member 4 contact the first fitting recess 1b1 of the frame 1 and the first projecting portions 5c of the second dustproof member 5 contact the second fitting recess 1b2 of the frame 1.

Thus, a gap between the base portion 4a of the first dustproof member 4 and the first fitting recess 1b1 of the frame 1 and a gap between the base portion 5a of the second dustproof member 5 and the second fitting recess 1b2 of the frame 1 are continuously closed, in the X-axis direction. Therefore, dust and the like can be prevented from entering the frame 1 through the gaps.

Preferably, each of the first projecting portions 4c of the first dustproof member 4 and the first projecting portions 5c of the second dustproof member 5 includes a curved portion (has an arc-like shape) when viewed in the X-axis direction. Preferably, the curved portion is formed over the entirety of each of the first projecting portions 4c of the first dustproof member 4 and the first projecting portions 5c of the second dustproof member 5 in the X-axis direction.

In the present embodiment, each of the first projecting portions 4c of the first dustproof member 4 and the first projecting portions 5c of the second dustproof member 5 has a substantially semicircular shape when viewed in the X-axis direction. Thus, when the first projecting portions 4c of the first dustproof member 4 contact the first fitting recess 1b1 of the frame 1 and when the first projecting portions 5c of the second dustproof member 5 contact the second fitting recess 1b2 of the frame 1, the first projecting portions 4c and 5c become easily deformed due to stress concentration. Moreover, the area of contact between the first projecting portions 4c of the first dustproof member 4 and the first fitting recess 1b1 of the frame 1 and the area of contact between the first projecting portions 5c of the second dustproof member 5 and the second fitting recess 1b2 of the frame 1 can be increased. Therefore, dust and the like can be more reliably prevented from entering the frame 1.

Preferably, one of the first projecting portions 4c of the first dustproof member 4 projects from a surface of the base portion 4a of the first dustproof member 4 facing in the negative Y-axis direction. Likewise, preferably, one of the first projecting portions 5c of the second dustproof member 5 projects from a surface of the base portion 5a of the second dustproof member 5 facing in the negative Y-axis direction. In this case, entry of dust and the like can be prevented at a position farther from the inside of the frame 1, so that dust and the like are more unlikely to enter the inside of the frame 1.

The number of the first projecting portions 4c of the first dustproof member 4 may be one or more. Preferably, a plurality of the first projecting portions 4c are formed on the base portion 4a of the first dustproof member 4. Likewise, the number of the first projecting portions 5c of the second dustproof member 5 may be one or more. Preferably, a plurality of the first projecting portions 5c are formed on the base portion 5a of the second dustproof member 5. In this case, dust and the like can be prevented from entering the frame 1 at a plurality of positions.

In the present embodiment, two first projecting portions 4c are formed on the base portion 4a of the first dustproof member 4, and two first projecting portions 5c are formed on the base portion 5a of the second dustproof member 5. To be specific, the two first projecting portions 4c of the first dustproof member 4 are respectively formed on a part of a surface of the base portion 4a facing in the positive Y-axis direction, the part being farther from the opening 1a, and on a part of a surface of the base portion 4a facing in the negative Y-axis direction, the part being nearer to the opening 1a, so as to be substantially symmetric with respect to a line that passes through the rotation center of the base portion 4a of the first dustproof member 4 and that extends in the X-axis direction.

The two first projecting portions 5c of the second dustproof member 5 are formed on a part of a surface of the base portion 5a facing in the positive Y-axis direction, the part being farther from the opening 1a, and on a part of a surface of the base portion 5a facing in the negative Y-axis direction, the part nearer to the opening 1a, so as to be substantially symmetric with respect to a line that passes through the rotation center of the base portion 5a of the second dustproof member 5 and that extends in the X-axis direction.

Thus, the rotation diameters of the base portion 4a of the first dustproof member 4 and the base portion 5a of the second dustproof member 5 can be increased, and therefore the first projecting portions 4c and 5c can be deformed to a larger degree. As a result, dust and the like can be more reliably prevented from entering the frame 1.

Preferably, each of the second projecting portion 4d of the first dustproof member 4 and the second projecting portion 5d of the second dustproof member 5 has a curved portion (has an arc-like shape) when viewed in the X-axis direction. Preferably, the curved portion is formed over substantially the entirety of each of the second projecting portion 4d of the first dustproof member 4 and the second projecting portion 5d of the second dustproof member 5 in the X-axis direction.

In the present embodiment, each of the second projecting portion 4d of the first dustproof member 4 and the second projecting portion 5d of the second dustproof member 5 has a substantially semicircular shape when viewed in the X-axis direction. Thus, when the second projecting portions 4d and 5d contact the detector 3, the second projecting portions 4d and 5d become easily deformed due to stress concentration, and the area of contact between the detector 3 and each of the second projecting portions 4d and 5d can be increased. Therefore, dust and the like can be more reliably prevented from entering the frame 1.

Preferably, the second projecting portions 4d and 5d are formed so that the tip portion of the first dustproof member 4 and the tip portion of the second dustproof member 5 contact the detector 3 when the second projecting portion 4d of the first dustproof member 4 and the second projecting portion 5d of the second dustproof member 5 contact the detector 3 and become deformed.

In this case, preferably, at least parts of the tip portions of the first dustproof member 4 and the second dustproof member 5 near the positions at which the tip portions contact the detector 3 each include a curved portion (arc-like portion) when viewed in the X-axis direction. In the present embodiment, the tip portion of the first dustproof member 4 and the tip portion of the second dustproof member 5 each has a substantially semicircular shape when viewed in the X-axis direction.

Thus, when the tip portion of the first dustproof member 4 and the tip portion of the second dustproof member 5 contact the detector 3, the tip portions easily become deformed due to stress concentration, and therefore the area of contact between the detector 3 and the tip portion of each of the first dustproof member 4 and the second dustproof member 5 can be increased. Moreover, dust and the like can be prevented from entering the frame 1 in two steps, that is, contact between the detector 3 and the tip portion of each of the first dustproof member 4 and the second dustproof member 5 and contact between the detector 3 and each of the second projecting portions 4d and 5d.

Second Embodiment

Figure 5:
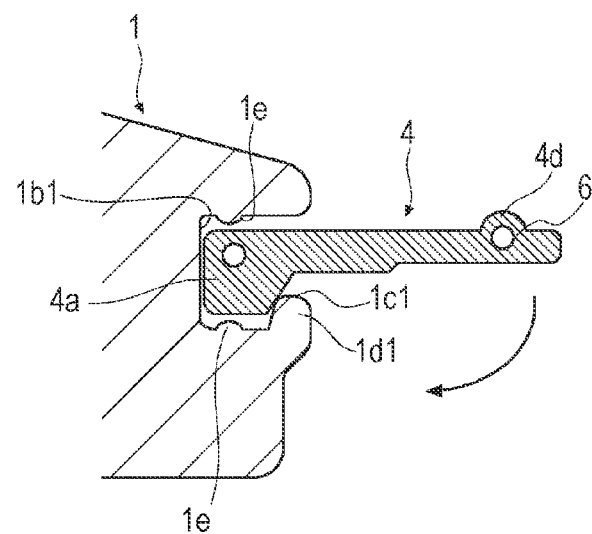
FIG. 5 is a schematic partial sectional view of a dustproof structure according to a second embodiment.

FIG. 5 is an enlarged view illustrating a region near a first fitting recess of a frame of a dustproof structure according to a second embodiment. Because the dustproof structure of the present embodiment is substantially similar to that of the first embodiment, redundant description will be omitted and the same elements will be denoted by the same numerals.

In the dustproof structure of the first embodiment, the first projecting portions are formed on each of the first dustproof member 4 and the second dustproof member 5. As illustrated in FIG. 5, projecting portions 1e may be formed in the first fitting recess 1b1 of the frame 1. The projecting portions 1e contact the base portion 4a of the first dustproof member 4 when the first dustproof member 4 is warped to close toe opening 1a of the frame 1 together with the second dustproof member 5. Thus, as with the dustproof structure of the first embodiment, dust and the like can be prevented from entering the frame 1.

Although only a region near the first fitting recess 1b1 is illustrated in FIG. 5, projection portions are also formed in the second fitting recess 1b2, and the projecting portions contact the base portion 5a of the second dustproof member 5 in a warped state.

Although two projecting portions 1e are formed in FIG. 5, the number of the projecting portion is not limited, and may be only one or more than one. The dustproof structure of the second embodiment and the dustproof structure of the first embodiment may be used in combination.

The present invention is not limited to the above-described embodiments, and appropriate modifications are possible within the scope of the present invention.

In the first embodiment, the first projecting portions 4c and 5c are integrally formed with the base portions 4a and 5c and other members from the same material. However, the first projecting portions 4c and 5c and the base portions 4a and 5a may be made from different materials. In this case, preferably, the first projecting portions 4c and 5c are made from a material that is more easily deformable than that of the base portions 4a and 5a.

In the first embodiment, the second projecting portions 4d and 5d are integrally formed with the base portions 4a and 5a and other members from the same material. However, the second projecting portions 4d and 5d and the base portions 4a and 5a may be made from different materials. In this case, preferably, the second projecting portions 4d and 5d are also made from a material that is more easily deformable than that of the base portions 4a and 5a.

What is claimed is:

1. A linear encoder comprising:
    a scale;
    a frame in which the scale is held, the frame having an opening that extends in a longitudinal direction of the frame; and
    a pair of elongated dustproof members arranged to face each other in the opening, at least a part of each dustproof member being elastically deformable, each dustproof member including
        a first end portion in a transverse direction of the dustproof member,
        a first projecting portion disposed on the first end portion, and
        a second end portion in the transverse direction,
    wherein the opening has a pair of fitting recesses formed therein, and
    wherein the first end portion of each dustproof member is fitted in a corresponding one of the fitting recesses, and the first projecting portion contacts the corresponding one of the fitting recesses.

2. A linear encoder comprising:
    a scale;
    a frame in which the scale is held, the frame having an opening that extends in a longitudinal direction of the frame; and a pair of elongated dustproof members arranged to face each other in the opening, at least a part of each dustproof member being elastically deformable, each dustproof member including
  a first end portion in a transverse direction of the dustproof member, and
  a second end portion in the transverse direction,
wherein the opening has a pair of fitting recesses formed therein, and each fitting recess has a second projecting portion formed therein, and
wherein the first end portion of each dustproof member is fitted in a corresponding one of the fitting recesses, and the first end portion contacts the second projecting portion.

3. The linear encoder according to claim 1,
wherein the first projecting portion has an arc-like cross-sectional shape.

4. The linear encoder according to claim 2,
wherein the second projecting portion has an arc-like cross-sectional shape.

5. The linear encoder according to claim 1,
wherein a pair of the first projecting portions are disposed on both surfaces of the first end portion of each dustproof member.

6. The linear encoder according to claim 3,
wherein a pair of the first projecting portions are disposed on both surfaces of the first end portion of each dustproof member.

7. The linear encoder according to claim 2,
wherein a pair of the second projecting portions are disposed on surfaces of each fitting recess that face both surfaces of the first end portion of each dustproof member.

8. The linear encoder according to claim 4,
wherein a pair of the second projecting portions are disposed on surfaces of each fitting recess that face both surfaces of the first end portion of each dustproof member.

9. The linear encoder according to claim 1,
wherein each dustproof member further includes a third projecting portion disposed on the second end portion, the third projecting portion having an arc-like cross-sectional shape.

10. The linear encoder according to claim 2,
wherein each dustproof member further includes a third projecting portion disposed on the second end portion, the third projecting portion having an arc-like cross-sectional shape.

11. The linear encoder according to claim 3,
wherein each dustproof member further includes a third projecting portion disposed on the second end portion, the third projecting portion having an arc-like cross-sectional shape.

12. The linear encoder according to claim 4,
wherein each dustproof member further includes a third projecting portion disposed on the second end portion, the third projecting portion having an arc-like cross-sectional shape.

13. The linear encoder according to claim 5,
wherein each dustproof member further includes a third projecting portion disposed on the second end portion, the third projecting portion having an arc-like cross-sectional shape.

14. The linear encoder according to claim 6,
wherein each dustproof member further includes a third projecting portion disposed on the second end portion, the third projecting portion having an arc-like cross-sectional shape.

15. The linear encoder according to claim 7,
wherein each dustproof member further includes a third projecting portion disposed on the second end portion, the third projecting portion having an arc-like cross-sectional shape.

16. The linear encoder according to claim 8,
wherein each dustproof member further includes a third projecting portion disposed on the second end portion, the third projecting portion having an arc-like cross-sectional shape.

17. The linear encoder according to claim 1,
wherein an end of the second end portion of each dustproof member has an arc-like cross-sectional shape.

18. The linear encoder according to claim 2,
wherein an end of the second end portion of each dustproof member has an arc-like cross-sectional shape.

* * * * *